(12) United States Patent
Xiong et al.

(10) Patent No.: US 10,209,093 B2
(45) Date of Patent: Feb. 19, 2019

(54) SERVO GEAR IDLE POSITION MEASURING DEVICE AND METHOD

(71) Applicant: UBTECH Robotics Corp., Shenzhen (CN)

(72) Inventors: Youjun Xiong, Shenzhen (CN); Lifu Zhang, Shenzhen (CN); Wenhua Fan, Shenzhen (CN); Zhongliang Wang, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 219 days.

(21) Appl. No.: 15/473,610

(22) Filed: Mar. 30, 2017

(65) Prior Publication Data

US 2018/0188073 A1    Jul. 5, 2018

(30) Foreign Application Priority Data

Dec. 31, 2016 (CN) .......................... 2016 1 1264334

(51) Int. Cl.
*G01M 13/02* (2006.01)
*G01D 5/02* (2006.01)
*G05B 19/4065* (2006.01)

(52) U.S. Cl.
CPC .............. *G01D 5/02* (2013.01); *G01M 13/02* (2013.01); *G05B 19/4065* (2013.01); *G05B 2219/42328* (2013.01)

(58) Field of Classification Search
CPC .................. G01D 5/02; G05B 19/4065; G05B 2219/42328; G01M 13/02
USPC ........................................................ 702/150
See application file for complete search history.

(56) References Cited

U.S. PATENT DOCUMENTS

2006/0290313 A1\* 12/2006 Ment .................... G05B 19/351
                                                            318/638
2018/0188136 A1\* 7/2018 Zhu ........................ G01M 13/02

FOREIGN PATENT DOCUMENTS

CN           202648946 U  \*  1/2013

\* cited by examiner

*Primary Examiner* — Leslie J Evanisko

(57) ABSTRACT

A device sod a method for measuring servo gear idle position are provided. The method includes: outputting a start-up fixed force of a first rotation direction to an output shall of a servo under test, and recording a value of a start-up position of the output shaft when a position of a rotor of the servo under test changes for the first time; outputting a counterrotation force of a second rotation direction for rotating the output shaft to the output shaft, and recording a value of an counterrotation position of the output shaft when the rotor is in a stop status after a predetermined interval; and calculating a value of a servo gear idle position in a current measuring point, the value of the idle position is the absolute value of the difference between the value of the start-up position and the value of the counterrotation position.

14 Claims, 5 Drawing Sheets

US 10,209,093 B2

SERVO GEAR IDLE POSITION MEASURING DEVICE AND METHOD

CROSS REFERENCE TO RELATED APPLICATIONS

This application claims priority to Chinese Patent Application No. 201611264334.5, filed Dec. 31, 2016, which is hereby incorporated by reference herein as if set forth in its entirety.

BACKGROUND

1. Technical Field

The present disclosure generally relates to servo measurement, and particularly to servo idle position measurement.

2. Description of Related Art

A servo can be divided into three systems: 1) housing and gear deceleration system, 2) motor and motor driving system, and 3) servo measurement electronic control system. As a key component of equipment such as a robot and a space model, the quality of the servo directly affects the overall performance of the whole robot or model, and the idle position of the gear of the servo is a key indicator to judge the performance of the servo itself. The idle position can be comprehended as the degree of the freedom of the output shaft of the servo when the rotor of the servo is not moving. The reason for a new servo to have a larger idle position can be attributed to manufacture accuracy insufficiency or design defects, for example, an over-large gear gap, the gap between the shaft and the shaft hole, etc. When a idle position emerges after a servo is used for a period of time, which may be caused by the wearing of the output shaft, the reaming of the gear shaft, or the wearing of the gear.

However, most traditional servo gear idle position measurements are in need of external measurement tools and sensors such as angle sensors, and the measurement operation processes are complicated.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

In order that the technical problems, technical solutions and advantageous effects to be solved by the present invention can be more clearly understood, the present invention will be described in more detail with reference to the accompanying drawings and examples. It is to be understood that the described embodiments are a part of embodiments of the present invention, and not all embodiments. Based on the described embodiments of the present invention, all other embodiments obtained by those ordinary skilled in the art without the use of inventive labor are within the scope of the present invention.

Embodiment 1

Figure 1:
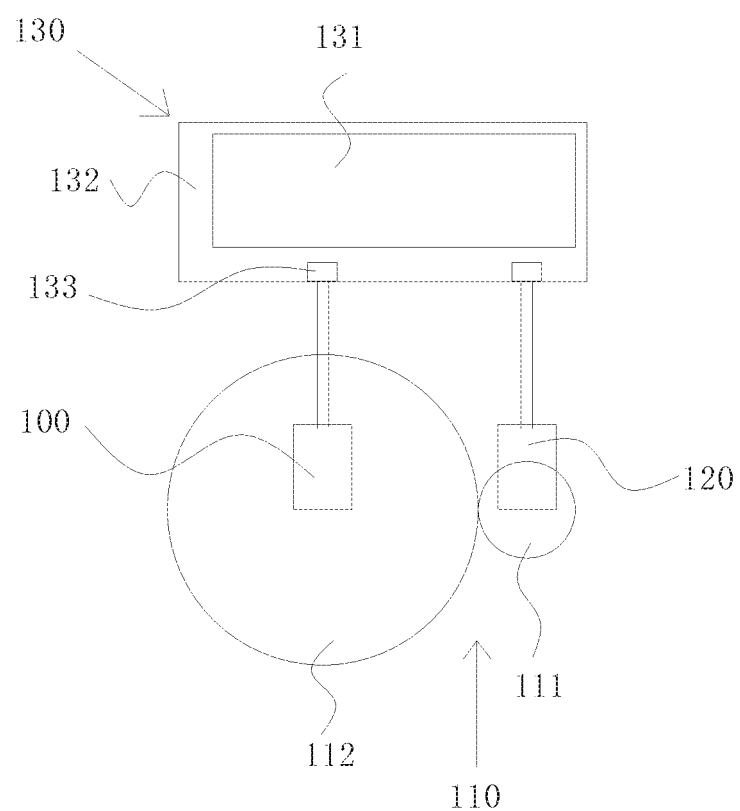
FIG. 1 is a schematic diagram of the structure of a servo gear idle position measuring device according to an embodiment of the present disclosure.

As shown in FIG. 1, a servo gear idle position measuring device according to an embodiment of the present disclosure includes a gear plate set 110, a power servo 120, and a host 130. The gear plate set 110 includes a power gear plate 111 and a driven gear plate 112 which are gearing connected with each other. The power servo 120 is controlled by the host 130. The power servo 120 is used to rotate the power gear plate 111. The power gear plate 111 is decelerating gearing connected with the driven gear plate 112. A center of the driven gear plate 112 is used to connect an output shaft of a servo under test 100. The host 130 is used to measure a rotor position information and an output shaft position information of the servo under test 100.

Figure 2:
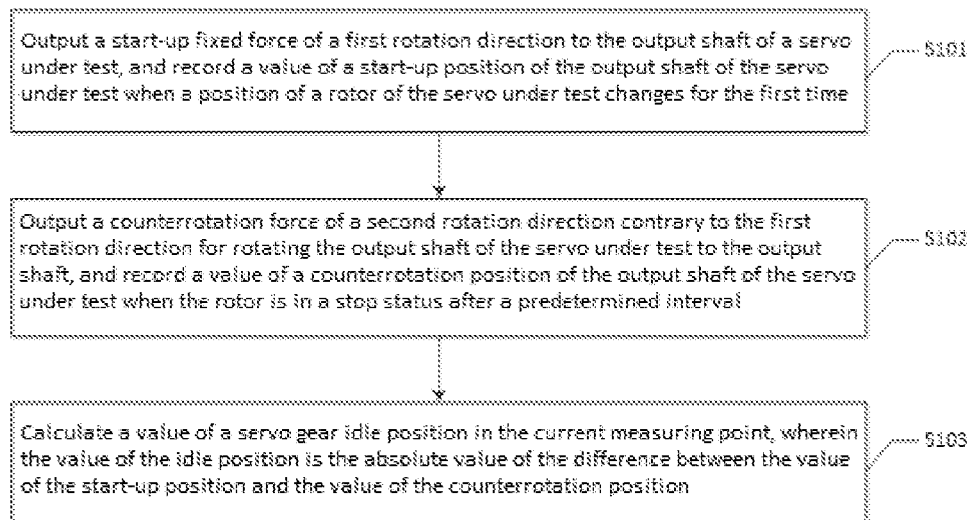
FIG. 2 is a Slow chart of a servo gear idle position measuring method according to a first embodiment of the present disclosure.

As shown in FIG. 2, a servo gear idle position measuring method according to a first embodiment of the present disclosure includes the following steps:

S101: outputting a start-up fixed force of a first rotation direction to the output shaft of a servo under test 100, and recording a value of a start-up position of the output shaft of the servo under test 100 (i.e., the output shaft position information) when a position of a rotor of the servo under test 100 changes for the first time. Furthermore, the outputting a start-up fixed force of a first rotation direction to an output shall of a servo under test 100 specifically includes: utilizing the power servo 120 to output the start-up fixed force of the first rotation direction, the start-up fixed force being transmitted to the output shaft of the servo under test 100 after being decelerated by the gear plate set 110. The start-up fixed force of the first rotation direction output by the power servo 120 means a force applied to the power gear plate 111 by rotating the output shaft of the power servo 120.

For a current measuring point of the servo under test 100, the start-up position represents the gears of a gear deceleration system of the servo under test 100 are in close contact with each other in a current position, and the rotor of the servo under test 100 has a tendency to rotate in the first rotation direction but not rotates yet.

S102: outputting a counterrotation force of a second rotation direction contrary to the first rotation direction for rotating the output shaft of the servo under test 106 to the output shaft of the servo under test 100, and recording a value of a counterrotation position of the output shaft of the servo under test 100 when the rotor of the servo under test 100 is in a stop status after a predetermined interval. Furthermore, the outputting a counterrotation force of a second rotation direction contrary to the first rotation direction for rotating the output shaft of the servo under test 100 to the output shaft of the servo under test 100 specifically includes: utilizing the power servo 120 to output the counterrotation force of the second rotation direction, the counterrotation force being transmitted to the output shaft of the servo under test 100 after being decelerated by the gear plate set 110.

For the current measuring point of the servo under test 100, the counterrotation position represents the gears of the gear deceleration system of the servo under test 100 are in close contact with each other in the current position, and the rotor of the servo under test 100 has a tendency to rotate in the second rotation direction but not rotates yet. From the start-up position to the counterrotation position, only the gears in the gear deceleration system of the servo under test 100 are changed from in close contact with each other toward the first rotation direction to in close contact with each other toward the second rotation direction, but the rotor of a motor of the servo under test 100 not rotates yet. The difference between the value of the start-up position and the value of the counterrotation position just reflects a value of a gear idle position of the current measuring point of the servo under test 100.

S103: calculating a value of a servo gear idle position in the current measuring point, wherein the value of the idle position is the absolute value of the difference between the value of the start-up position and the value of the counterrotation position.

The device and the method for measuring servo gear idle position provided by the present disclosure utilizes a position sensor provided in a servo under test to measure the idle position of a servo gear. Since there is no necessary to use an external angle sensor, and the overall operation is simple, the possibility of external interferences during the measurement -process is greatly reduced, and the accuracy of the measurement results is relatively stable.

In addition, the power servo 120 is utilized to provide the startup fixed force and the counterrotation force, which facilitates the automation of servo gear idle position measurements, and also enables automatic continuous measurement of the value of the idle position of different position points of a same servo.

The power gear plate 111 is decelerating gearing connected with the driven gear plate 112. For the idle positions of the gears of the servo under test with a same size, the power servo 120 is required to output a greater rotational, angle to the output shaft of the servo under test 100, which can amplify the idle positions of the gears, and the accuracy of measurement is therefore improved.

Preferably, the decelerating gearing connection between, the power gear plate 111 and the driven gear plate 112 can be realized by the following two means or the combination of the two means:

One, the diameter of the power gear plate 111 is less than the diameter of the driven gear plate 112.

Two, the gear plate set 110 further includes a transmission gear plate (not shown), the power gear plate 111 and the driven gear plate 112 are decelerating geared through the transmission gear plate.

Typically, the gearing ratio of the power gear plate 111 and the driven gear plate 112 is ranged from 2:1 to 5:1, for example, 3:1 and 4:1. It is possible to reduce the volume of a measuring device while ensuring the accuracy of measurements.

As a further enhancement of the present disclosure, the gear plate set 110 can include a plurality of the driven gear plate 112, thereby accommodating to the servos under test which have various specifications.

As a further -enhancement of the present disclosure, the servo gear idle position measuring device further includes a fixing device (not shown). The gear plate set 110 and the power servo 120 are connected to the fixing device. The fixing device has a servo seat for placing the servo under test 100. When the servo under test 100 is placed on the servo seat, the driven gear plate 112 is connected with the output shaft of the servo under test 100.

Preferably, the host 130 further includes a display 131, a controller 132, and a first servo interface 133 utilized to electrically connect with the servo under test 100. The controller 132 is electrically connected with the display 131, the first servo interface 133, and the power servo 120. The servo gear idle position measuring device with the display 131 can display idle position information, and is easy to carry and store since the overall device is small, in size. In another embodiment the host 130 also includes an interface to communicate with an external device such as a computer- and a master control device, so as to integrate the servo gear idle position measuring device into an automatic measurement system or a production line.

Figure 3:
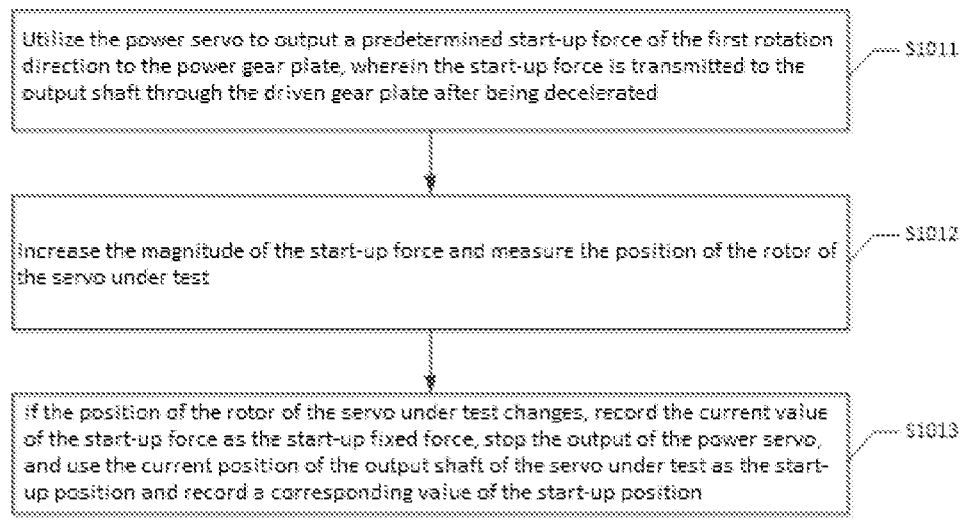
FIG. 3 is a Row chart of an embodiment of step S101 in FIG. 2.

Preferably, as shown in FIG. 3, the outputting a start-up fixed force of a first rotation direction to an output shaft of a servo under test 100, and recording a value of a start-up position of the output shaft of the servo under test 100 when the position of the rotor of the servo under test 100 changes for the first time in step S101 of FIG. 1 specifically includes the following steps:

S1011: utilizing the power servo 120 to output a predetermined start-up force of the first rotation direction to the power gear plate 111, wherein the start-up force is transmitted to the output shaft of the servo under test 100 through the driven gear plate 112 after being decelerated;

S1012: increasing the magnitude of the start-up force and measuring the position of the rotor of the servo under test 100 (i.e., the rotor position information); and S1013: if the position of the rotor of the servo under test 100 changes, recording the current value of the start-up force as the start-up fixed force, stopping the output of the power servo 120, and using the current position of the output shall of the servo under test 100 as the start-up position and recording a corresponding value of the start-up position.

A force just capable of enabling the rotor of the servo under test 100 to rotate is measured by gradually increasing the magnitude of the start-up force, and the value of the start-up position of the output shaft is recorded at the same time. The start-up fixed force can be used to calculate the counterrotation force that enables the output shaft of the servo under test 100 to rotate reversely while the/rotor does not move, which can save the measuring time.

Preferably, the predetermined start-up force is specifically 1% of a full output force of the power servo 120. The increasing the magnitude of the start-up force is specifically increasing the magnitude of the start-up force by 1% of the full output force of the power servo 120 for every predetermined interval.

Figure 4:
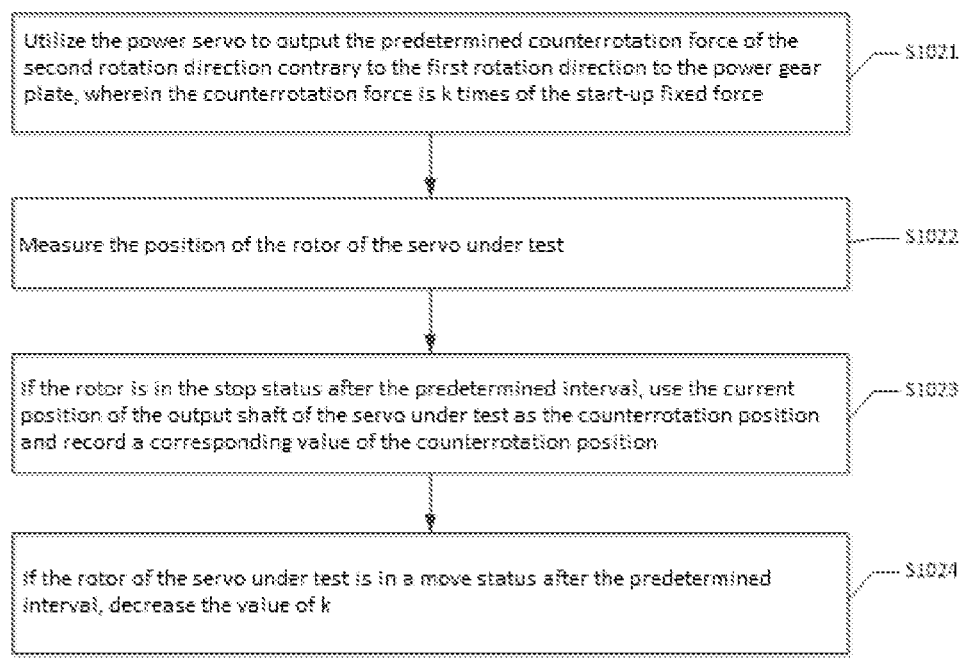
FIG. 4 is a flow chart of an embodiment of step S102 in FIG. 2.

Preferably, as shown in FIG. 4, the outputting a counterrotation force of a second rotation direction to the output shaft of the servo under test, the counterrotation force rotating the output shaft of the servo under test, recording a value of an counterrotation position of the output shaft of the servo under test 100 when the rotor of the servo under test 100 is in a stop status after a predetermined interval in step S102 of FIG. 1 specifically includes the following steps:

S1021: utilizing the power servo 120 to output the predetermined counterrotation force of the second rotation direction contrary to the first rotation direction to the power gear plate 111, wherein the counterrotation force is k times of the start-up fixed force, and k is greater than 0. The value of k preferably satisfies the equation $0.5<k<1$. The magnitude of the counterrotation force is determined based on the start-up fixed force, which reduces the range of the start-up fixed force need to be searched, and the measuring time can therefore be saved;

S1022: measuring the position of the rotor of the servo under test 100;

S1023: if the rotor of the servo under test 100 is in the stop status after the predetermined interval, using the current position of the output shaft of the servo under test 100 as the counterrotation position and recording a corresponding value of the counterrotation position. In the predetermined interval, the output shaft of the servo under test 100 rotates from the start-up position to the counterrotation position, the gears in the gear deceleration system of the servo under test 100 are changed from in close contact with each other toward the first rotation direction to in close contact with each other toward the second rotation direction; and S1024: if the rotor of the servo under test 100 is in a move status after the predetermined interval, decreasing the value of k and adjusting the magnitude of the counterrotation force until the rotor of the servo under test can stop after outputting the counterrotation force and the predetermined interval is passed, and using the current position of the output shall of the servo under test 100 when the rotor stops as the counterrotation position and recording a corresponding value of the counterrotation position. If the value of k is too large, that is, the counterrotation force is too large, the magnitude of k is need to be decreased, and then execute the steps S101, S102 and S103 again until the magnitude of the counterrotation force is just capable of rotating the output shaft of the servo under test 100 reversely while the rotor does not move.

Preferably, the value of k is specifically decreased by 5%. The amplitude to adjust the value of k is getting smaller with the decrease of the value of k, so as to precisely approach the magnitude of a force which enables the output shaft of the servo under test 100 to rotate reversely while the rotor does not move.

Embodiment 2

As a further enhancement of the present disclosure, after the calculating a value of a servo gear idle posit ion in a current measuring point further includes the following steps:

Controlling the servo under test 100 to rotate with a predetermined angle to a next measuring point;

Measuring the value of the servo gear idle position of the next measuring point; and After measuring the value of the servo gear idle position of all the measuring points, calculating a mean or a probability distribution of the value of the servo gear idle position of all the measuring points.

It is possible to realize the automatic continuous measurement of the idle position of different position points of a servo under test by utilizing the host 130 to control the servo under test 100 to rotate with a predetermined angle to each measuring point. Obtaining the mean or the probability distribution of the idle positions of the gear of the servo under test 100 can comprehensively represent the idle positions of the gear of the servo under test 100 which reflects the quality of the servo under test 100. Preferably, the predetermined angle is 360/n, and n is the amount of the measuring point.

Figure 5:
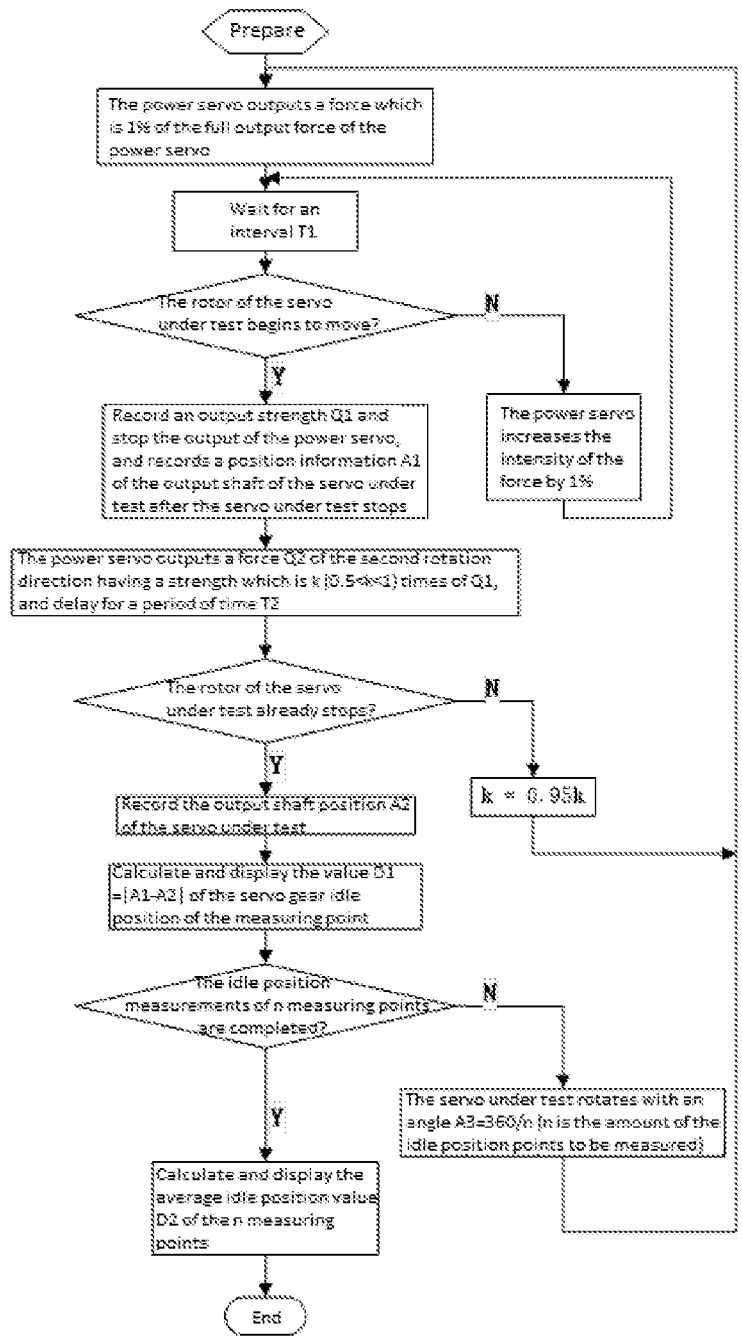
FIG. 5 is a flow chart of a servo gear idle position measuring method according to a second embodiment of the present disclosure.

For a better understanding of the servo gear idle position measuring method in the embodiments of the present disclosure, a specific application scenario is provided below, with reference to FIG. 5.

After the system is powered up, the host 130 operates the servo under test 100 and the power servo 120 according to the foil-owing control sequence:

a, the host 130 continuously reads back the rotor position information of the servo under test 100 which used to determine whether the servo under test 100 is in a rotation status, and controls the power servo 120 to output a force which k 1% of the full output force of the power servo 120, and the intensity of the force is increased by 1% for every interval T1. Until the host 130 detects that the rotor of the servo under test 100 is in a rotation status for the first time, records an output strength Q1 of the power servo 120 and stops the output of the power servo 120. After the servo under test 100 returns to the stop status, records a position information A1 of the output shaft of the servo under test 100.

b, the host 130 controls the power servo 120 to output a force Q2 of the second rotation direction having a strength which is k (0.5<k<1, preferably 0.9) times of Q1, and continuously reads back the position information of the rotor of the servo under test 100. A current position information A2 of the output shaft of the servo under test 100 is recorded when the rotor of the servo under test 100 is detected to be in the stop status after the Q2 is outputted for a period of time T2 (recommended to be more than 2 seconds). If the rotor of the servo under test 100 is detected to be not in the stop status after the Q2 is outputted for the period of time T2, the value of the coefficient k is reduced by 5%, and the step a and fa are repeated until a position information A2 of the servo under test 100 is successfully obtained.

c, the host 130 calculates the value D1=|A1−A2| of the servo gear idle position of the current measuring point and displays the calculation result through the host 130, while the host 130 controls the servo under test 100 to rotate with a certain angle A3=360/n (n is the amount of the idle position points to be measured), and repeats the step a and b until all the n times of measurements with respect to the servo under test 100 are completed, and then the average idle position value D2 of the n measuring points are calculated and displayed. Consequently, the idle position measurement of the gear of the servo under test 100 is completed.

Although the features and elements of the present disclosure are described as embodiments in particular combinations, each feature or element can he used alone or in other various combinations within the principles of the present disclosure to the full extent indicated by the broad general meaning of the terms in which the appended claims are expressed.

What is claimed is:

1. A servo gear idle position measuring method, comprising:
    outputting a start-up fixed force of a first rotation direction to an output shaft of a servo under test, and recording a value of a start-up position of the output shaft of the servo under test when a position of a rotor of the servo under test changes for the first time;
    outputting a counterrotation force of a second rotation direction contrary to the first rotation direction for rotating the output shaft of the servo under test to the output shaft of the servo under test, and recording a value of an counterrotation position of the output shaft of the servo under test when the rotor of the servo under test is in a stop status after a predetermined interval; and
    calculating a value of a servo gear idle position in a current measuring point, wherein the value of the idle position is the absolute value of the difference between the value of the start-up position and the value of the counterrotation position.

2. The method of claim 1, wherein:
the outputting a start-up fixed force of a first rotation direction to an output shaft of a servo under test comprises: utilizing a power servo to output the start-up fixed force of the first rotation direction, the start-up fixed force being transmitted to the output shaft of the servo under test after being decelerated by a gear plate set;
the outputting a counterrotation force of a second rotation direction contrary to the first rotation direction to the output shaft of the servo under test comprises: utilizing the power servo to output the counterrotation force of the second rotation direction, the counterrotation force being transmitted to the output shaft of the servo under test after being decelerated by the gear plate set.

3. The method of claim 1, wherein:
the outputting a start-up fixed force of a first rotation direction to an output shaft of a servo under test, and recording a value of a start-up position of the output shaft of the servo under test when a position of a rotor of the servo under test changes for the first time comprises:
utilizing the power servo to output a predetermined start-up force of the first rotation direction to a power gear plate, the start-up force being transmitted to the output shaft of the servo under test through a driven gear plate after being decelerated;
increasing the magnitude of the start-up force and measuring the position of the rotor of the servo under test; and
if the position of the rotor of the servo under test changes, recording the current value of the start-up force as the start-up fixed force, stopping the output of the power servo, and using the current position of the output shaft of the servo under test as the start-up position and recording a corresponding value of the start-up position.

4. The method of claim 3, wherein the predetermined start-up force is 1% of a full output force of the power servo, the increasing the magnitude of the start-up force is increasing the magnitude of the start-up force by 1% of the full output force of the power servo for every predetermined interval.

5. The method of claim 3, wherein the outputting a counterrotation force of a second rotation direction, contrary to the first rotation direction for rotating the output shaft of the servo under test to the output shaft of the servo under test, and recording a value of an counterrotation position, of the output shaft of the servo under test when the rotor of the servo under test is in a stop status after a predetermined interval comprises:
utilizing the power servo to output the predetermined counterrotation force of the second rotation direction contrary to the first rotation direction to the power gear plate, the counterrotation force being k times of the start-up fixed force, k being greater than 0;
measuring the position of the rotor of the servo under test;
if the rotor of the servo under test is in the stop status after the predetermined interval using the current position of the output shaft of the servo under test as the counterrotation position and recording a corresponding value of the counterrotation position; and if the rotor of the servo under test is in a move status after the predetermined interval, decreasing the value of k and adjusting the magnitude of the counterrotation force until the rotor of the servo under test can stop after outputting the counterrotation force and the predetermined interval is passed, and using the current position of the output shaft, of the servo under test when the rotor stops as the counterrotation position and recording a corresponding value of the counterrotation position.

6. The method of claim 5, wherein the value of k satisfies the equation 0.5<k<1, the value of k is decreased by 5%.

7. The method of claim 1, wherein after the calculating a value of a servo gear idle position in a current measuring point further comprises:
controlling the servo under test to rotate with a predetermined angle to a next measuring point;
measuring the value of the servo gear idle position of the next measuring point; and
after measuring the value of the servo gear idle position of all the measuring points, calculating a mean or a probability distribution of the value of the servo gear idle position of all the measuring point.

8. The method of claim 7, wherein the predetermined angle is 360/n, and n is the amount of the measuring point.

9. A servo gear idle position measuring device configured to perform the method of claim 1, comprising:
a gear plate set comprising a power gear plate and a driven gear plate gearing connected with each other;
a power servo; and
a host;
wherein the power servo is controlled by the host, the power servo is configured to rotate the power gear plate, the power gear plate is decelerating gearing connected with the driven gear plate, a center of the driven gear plate is configured to connect the output shaft of the servo under test, the host is configured to measure a rotor position information and an output shaft position information of the servo under test.

10. The device of claim 9, wherein the gear plate set further comprises a transmission gear plate, the power gear plate and the driven gear plate are decelerating geared through the transmission gear plate.

11. The device of claim 9, wherein the diameter of the power gear plate is less than the diameter of the driven gear plate.

12. The device of claim 10, wherein the gearing ratio of the power gear plate and the driven gear plate is ranged from 2:1 to 5:1.

13. The device of claim 9, further comprising a fixing device, wherein the gear plate set and the power servo is connected to the fixing device, the fixing device has a servo seat for placing the servo under test, the driven gear plate is connected with the output shaft of the servo under test when, the servo under test Is placed on the servo seat.

14. The device of claim 9, wherein the host further comprises a display, a controller, and a first servo interface configured to electrically connect with, the servo under test, the controller is electrically connected with the display, the first servo interface, and the power servo.

* * * * *